United States Patent [19]

Stüvecke et al.

[11] Patent Number: 4,854,250
[45] Date of Patent: Aug. 8, 1989

[54] PROCESS FOR THE DRAWING OF OPTICAL FIBERS THROUGH TEXTILES, AND A DEVICE FOR THE CARRYING OUT OF THE PROCESS

[76] Inventors: Claus-Peter Stüvecke, Stresemann Allee 90, D-2000 Hamburg 54; Johann Götz, Groden 7, D-2212 Brunsbüttel, both of Fed. Rep. of Germany

[21] Appl. No.: 2,628

[22] Filed: Nov. 5, 1986

[30] Foreign Application Priority Data

Mar. 8, 1985 [DE] Fed. Rep. of Germany ....... 3508252
Mar. 4, 1986 [WO] PCT Int'l Appl. ... PCT/EP86/00113

[51] Int. Cl.$^4$ ............................................. D05C 15/20
[52] U.S. Cl. ................................ 112/80.16; 112/266.2
[58] Field of Search ............................ 112/80.16, 266.2

[56] References Cited

U.S. PATENT DOCUMENTS 1,855,175 4/1932 Braudes .

FOREIGN PATENT DOCUMENTS 1919058 10/1970 Fed. Rep. of Germany .
2029033 12/1971 Fed. Rep. of Germany .

*Primary Examiner*—Ronald Feldbaum
*Attorney, Agent, or Firm*—Spencer & Frank

[57] ABSTRACT

A method of drawing an optical fiber through a fabric, having opposite first and second sides, comprises the following consecutive steps: advancing the optical fiber by a fiber transport device in a hollow needle to a predetermined extent; pushing the hollow needle, together with the optical fiber, through the fabric from the first side to the second side until a free end of the optical fiber has traversed the fabric to a predetermined extent; withdrawing the needle from the fabric to the first side thereof while maintaining the optical fiber substantially stationary relative to the fabric; gripping the free end of the fiber by a grasping device on the second side; pulling the optical fiber through the fabric until a predetermined pulled-through length of the optical fiber is obtained on the second side; and servering the optical fiber by a cutting device on the first side.

11 Claims, 2 Drawing Sheets

PROCESS FOR THE DRAWING OF OPTICAL FIBERS THROUGH TEXTILES, AND A DEVICE FOR THE CARRYING OUT OF THE PROCESS

BACKGROUND OF THE INVENTION

The invention involves a process for the drawing of optical fibers through textiles and a device for the carrying out of the process.

The use of optical fibers in conjunction with textiles for the purposes of illumination and decoration is well-known. To date, however, optical fibers could only be drawn through textiles manually. This process is an extremely time-consuming one and involves much expenditure of work.

SUMMARY OF THE INVENTION

An object of the invention is, therefore, to permit the drawing of optical fibers through textiles (woven fabric) by mechanical means, guaranteeing high standards of precision and speed.

This object and others to become apparent as the specification progresses, are accomplished by the invention, according to which, briefly stated, the method of drawing an optical fiber through a fabric, having opposite first and second sides, comprises the following consecutive steps: advancing the optical fiber by a fiber transport device in a hollow needle to a predetermined extent; pushing the hollow needle, together with the optical fiber, through the fabric from the first side to the second side until a free end of the optical fiber has traversed the fabric to a predetermined extent; withdrawing the needle from the fabric to the first side thereof while maintaining the optical fiber substantially stationary relative to the fabric; gripping the free end of the fiber by a grasping device on the second side; pulling the optical fiber through the fabric until a predetermined pulled-through length of the optical fiber is obtained on the second side; and severing the optical fiber by a cutting device on the first side.

DESCRIPTION OF THE PREFERRED EMBODIMENTS

Figure 1:
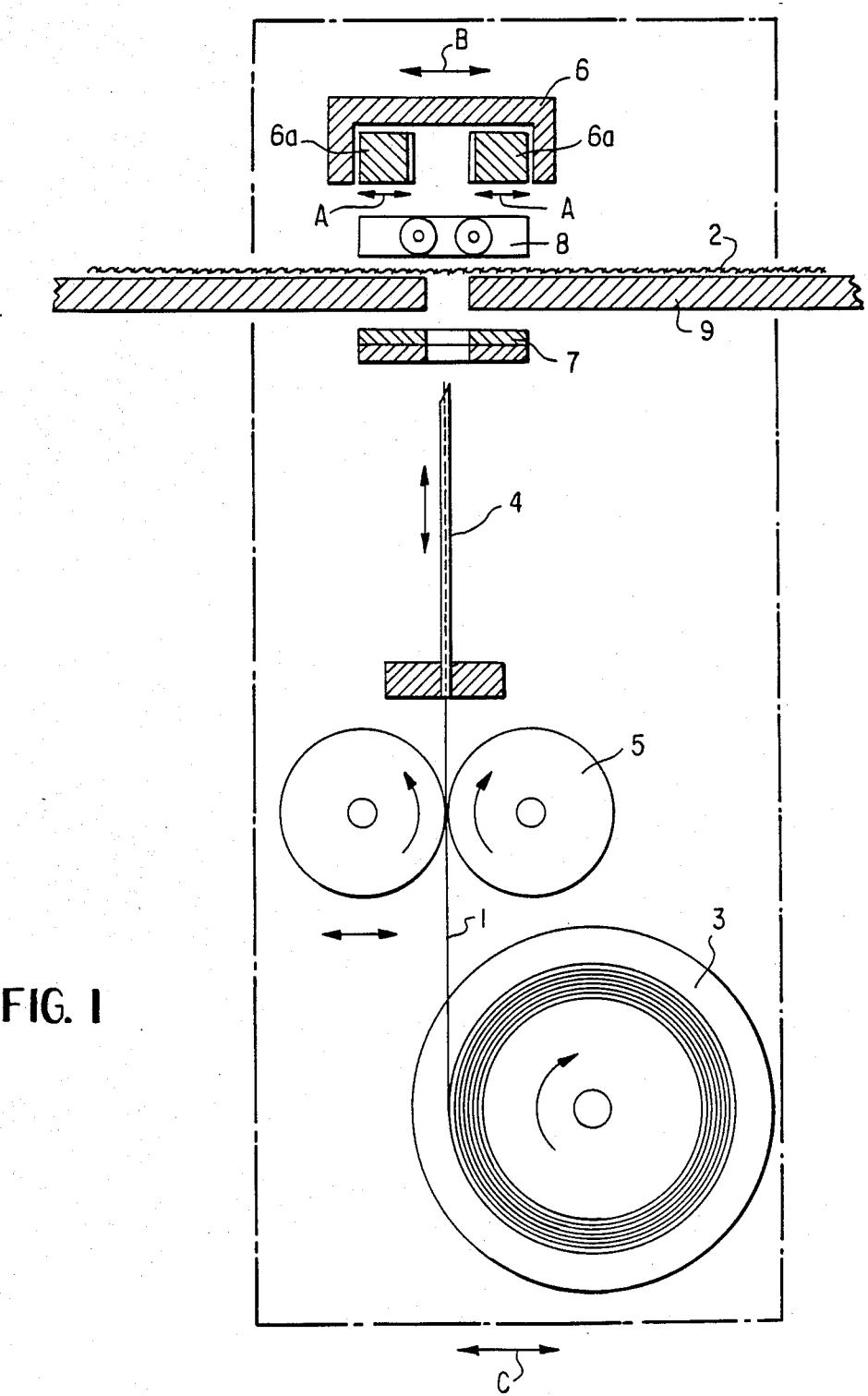
FIG. 1 is a schematic sectional side elevational view of a preferred embodiment of the invention.

A preferred embodiment of the invention according to FIG. 1 is made up essentially of the fiber spool (3), the hollow needle (4), the fiber-transport device (5), the grasping device (6), the cutting device (7), the holding-down device (8) and the working platform (9).

The textiles (2) to be processed are fed to the device either from a spool or in ready-cut pieces via the working platform (9). The fabric lies on the working platform with the front side facing downwards.

The hollow needle (4), the fiber-transport device (5), the fiber spool (3) and the cutting device (7) are located underneath the working platform.

The holding-down device (8) and the grasping device (6) are located above the working platform (9) and thus above the reverse side of the fabric.

At the beginning of a working cycle, the end of the optical fiber (1) is located in the hollow needle (4).

The hollow needle is movable in the direction of its longitudinal axis, i.e. "upwards" and "downwards", and is thrust from underneath through an opening provided in the working platform through the fabric (2) lying on it. In the process, the holding-down device (8) prevents the fabric (2) from being raised or shifted. The fiber-transport device (5) then pushes the optical fiber (1) sufficiently far forward in the hollow needle to enable the fiber-end to be gripped by the grasping device (6) as its jaws (6a) move toward one another as indicated by the double-headed arrows A.

After the optical fiber (1) has been gripped by the grasping device (6), the hollow needle (4) is drawn back to the starting position again.

Subsequently, the end of the optical fiber (1) gripped by the grasping device (6) is drawn through to the required length by means of the grasping device (6) as it travels in a direction indicated by the double-headed arrows B, to a predetermined location and deposited there. At the point of penetration of the fabric (2) the fiber is then secured to prevent its slipping out of position, preferably by the use of an adhesive.

After that, the optical fiber (1) is cut between the working platform (9) and the retracted hollow needle (4) by means of the cutting device (7) located underneath the working platform (9) such that a certain length of the optical fiber (1) projects out of the fabric (2), pointing downwards. The grasping device (6) then returns to the starting position above the hollow needle (4).

After the new end of the optical fiber (1), which following cutting still projects slightly out of the hollow needle (4), has been drawn back into the hollow needle (4) completely by the fiber-transport device (5), the device is ready to begin a new working cycle. For this purpose, the device (Part 3–8) advances to the next penetration point in a direction indicated by the double-headed arrow C, with the assistance of suitable guide and drive systems.

Preferably, penetration of the fabric (2) is carried out in a straight line and the optical fibers (1) laid in the direction of this line, so that, at the same time, the fibers at the point of penetration can be secured against slipping out and the remaining fibers laid on this line can be fixed.

Figure 2:
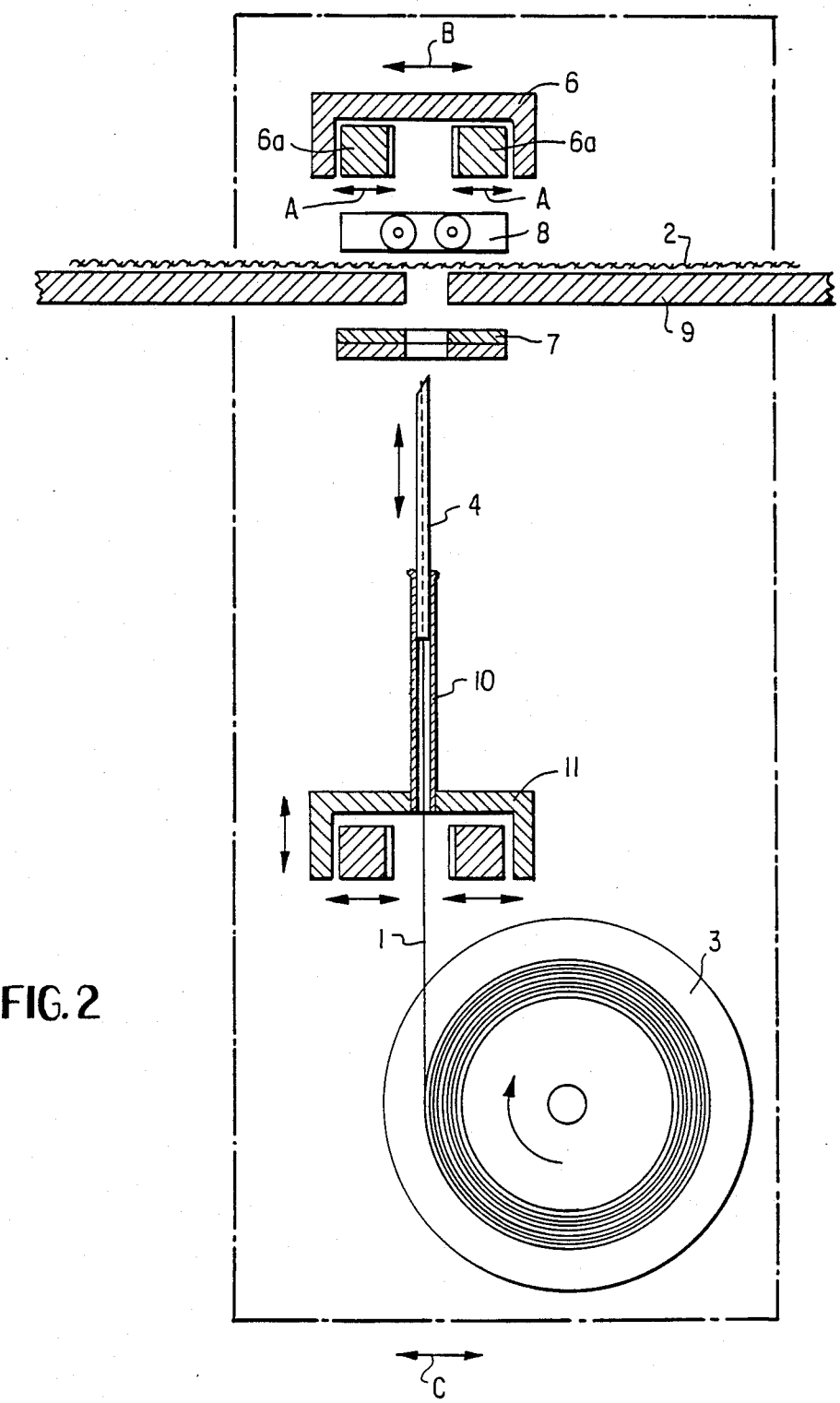
FIG. 2 is a schematic sectional side elevational view of another preferred embodiment of the invention.

According to another preferred embodiment of the invention shown in FIG. 2, the machine is equipped with a hollow needle (4) telescopically movable in a guidance tube (10) and a clamping device (11) located at the lower end of the guidance tube (10) instead of the fiber-transport device (5) of FIG. 1.

After the jaws (11a) of the clamping device (11) have grasped the fiber (1), the clamping device (11), the guidance tube (10) and the needle (4) in its extended state are moved upward, whereby the needle (4) pierces the fabric (2). The device (4, 10, 11) is stopped when the needle (4) is situated between the open jaws (6a) of the grasping device (6). Thereafter the hollow needle (4) is drawn back sufficiently far with the clamping device (11) in a closed position to enable the grasping device (6) to grip the free end of the optical fiber (1), which cannot be drawn back due to the closed jaws of the clamping device (11). The jaws (11a) of the clamping device (11) then open to enable the grasping device (6) to pull the gripped end of the optical fiber (1) on through and deposit it at a certain point as described in connection with the embodiment of FIG. 1.

After this has happened and the optical fiber (1) has been cut underneath the working platform (9) by the cutting device (7) between the working platform (9) and the retracted hollow needle (4), the hollow needle (4) is pushed forward sufficiently far relative to the guidance tube (10) to enable the new end of the optical fiber (1) to enter the hollow needle (4) completely. After that, the device is ready to begin a new working cycle.

We claim:

1. A method of drawing an optical fiber through a fabric having opposite first and second sides, comprising the following steps:
    (a) pushing a hollow needle, together with the optical fiber whose end is situated inside the needle in the zone of the needle tip, through the fabric from the first side to the second side until the needle tip is situated between open jaws of a grasping device on said second side; said hollow needle being telescopically supported by a guidance tube and being in an extended state relative to said guidance tube during the pushing step;
    (b) pulling, simultaneously with said pushing step, the optical fiber from a fiber supply with a clamping device; said hollow needle, said guidance tube and said clamping device moving as a unit during said pushing step;
    (c) withdrawing said hollow needle from between said jaws of the grasping device into said guidance tube relative to said clamping device;
    (d) maintaining, simultaneously with said withdrawing step, said optical fiber stationary by said clamping device, whereby said end of the optical fiber remains between said jaws of the grasping device;
    (e) grasping the end of said optical fiber by said jaws of said grasping device;
    (f) releasing said optical fiber by said clamping device;
    (g) pulling, subsequent to said releasing step, said optical fiber by said grasping device through said fabric until a predetermined pulled-through length of optical fiber is obtained on said second side;
    (h) moving the clamping device, the guidance tube and the hollow needle withdrawn therein, as a unit away from the fabric on the first side thereof;
    (i) severing the optical fiber by a cutting device at the fabric on said first side between the hollow needle and the fabric;
    (j) extending said hollow needle out of said guidance tube until the optical fiber is situated entirely within said hollow needle;
    (k) clamping the optical fiber with said clamping device; and
    (l) repeating steps (a) through (k) at different locations of the fabric.

2. A method as defined in claim 1, further comprising the step of supporting said fabric by a surface of a platform.

3. A method as defined in claim 1, further comprising the step of pressing, in a zone of intended penetration by said hollow needle, said fabric against said platform for preventing said fabric from shifting or from lifting off said platform.

4. A method as defined in claim 1, wherein said pulling step (g) includes the step of pulling the optical fiber in a direction substantially parallel to said fabric.

5. A method as defined in claim 1, further comprising the step of gluing said optical fiber to said fabric subsequent to step (g).

6. A method as defined in claim 4, further comprising the step of laying, subsequent to each step (g), each pulled-through length of the optical fiber by said grasping device on said fabric on the second side thereof, parallel to one another.

7. An apparatus for drawing an optical fiber through a fabric, comprising:
    (a) a platform having means defining an aperture, a first side and a second side opposite said first side; said fabric being supported by said platform on a surface thereof at said second side;
    (b) a needle assembly arranged at said first side and including
        (1) closable and openable clamping means for gripping and releasing the optical fiber;
        (2) a guidance tube connected to said clamping means;
        (3) a hollow needle telescopically supported by said guidance tube to assume extended and withdrawn positions relative to said guidance tube; said clamping means, said guidance tube and said hollow needle being arranged for movement as a unit from a first position in which the hollow needle, in its extended position, is in its entirety at said first side, into a second position in which the hollow needle, in its extended position, projects through said aperture and said fabric to a predetermined extent;
    (c) a grasping means situated on said second side of said platform for gripping a free end of the optical fiber subsequent to a telescoping movement of said needle out of the extended position into the withdrawn position thereof and for pulling the optical fiber through the fabric to a predetermined extent; and
    (d) a cutting means arranged at said first side of said platform for severing said optical fiber between said platform and said hollow needle when said needle assembly is in its said first position.

8. An apparatus as defined in claim 7, wherein said grasping means comprises closable and openable cooperating jaws for gripping and releasing the optical fiber.

9. An apparatus as defined in claim 7, further comprising a hold-down means arranged at said second side for pressing the fabric against said surface of said platform in a zone of the aperture thereof.

10. An apparatus as defined in claim 7, wherein said needle assembly, said grasping means and said cutting means are arranged to be moved as a unit parallel to said platform.

11. An apparatus as defined in claim 7, wherein said hollow needle has a tip formed of an oblique end face.

* * * * *

UNITED STATES PATENT AND TRADEMARK OFFICE
CERTIFICATE OF CORRECTION

PATENT NO. : 4,854,250

DATED : August 8, 1989

INVENTOR(S) : Claus-Peter Stüvecke et al

It is certified that error appears in the above-identified patent and that said Letters Patent is hereby corrected as shown below: Title page:

In the heading of the patent, [22] should read
--PCT Filed: March 4, 1986--.

In the heading of the patent, insert the following:

```
--[86] PCT No.:      PCT/EP86/00113
       § 371 Date:    Nov. 5, 1986
       § 102(e) Date: Nov. 5, 1986
   [87] PCT Pub. No.: WO 86/05217
       PCT Pub. Date: Sept. 12, 1986--.
```

In the heading of the patent, under [30], delete the third line.

Signed and Sealed this

Nineteenth Day of June, 1990

*Attest:*

HARRY F. MANBECK, JR.

*Attesting Officer*   *Commissioner of Patents and Trademarks*